United States Patent
Guo et al.

(10) Patent No.: US 9,533,269 B2
(45) Date of Patent: Jan. 3, 2017

(54) MULTIFUNCTIONAL FOOD PROCESSOR

(71) Applicant: GUANGDONG XINBAO ELECTRIC JOINT-STOCK LTD., Guangdong (CN)

(72) Inventors: Jiangang Guo, Guangdong (CN); Dingxun Sheng, Guangdong (CN)

(73) Assignee: GUANGDONG XINBAO ELECTRIC JOINT-STOCK LTD., Guangdong (CN)

(*) Notice: Subject to any disclaimer, the term of this patent is extended or adjusted under 35 U.S.C. 154(b) by 109 days.

(21) Appl. No.: 14/253,260

(22) Filed: Apr. 15, 2014

(65) Prior Publication Data
US 2015/0290602 A1   Oct. 15, 2015

(51) Int. Cl.
*B01F 15/00* (2006.01)
*B01F 7/00* (2006.01)
*A47J 43/07* (2006.01)

(52) U.S. Cl.
CPC ...... *B01F 15/00006* (2013.01); *A47J 43/0711* (2013.01); *B01F 7/00275* (2013.01); *B01F 7/00641* (2013.01); *B01F 7/00691* (2013.01)

(58) Field of Classification Search
CPC .............................................. B01F 15/00006
USPC ........................... 366/251, 327.1–327.4, 314
See application file for complete search history.

(56) References Cited

U.S. PATENT DOCUMENTS

| | | | | |
|---|---|---|---|---|
| 648,352 A | * | 4/1900 | Blanton, Jr. | F16D 1/092 403/333 |
| 1,253,394 A | * | 1/1918 | Lambie | B03D 1/16 261/87 |
| 2,118,346 A | * | 5/1938 | Goeritz | B65D 83/0011 222/390 |
| 2,431,478 A | * | 11/1947 | Hill | D06B 5/14 162/17 |
| 2,459,636 A | * | 1/1949 | Fenney | B01J 19/0013 366/170.3 |
| 3,166,303 A | * | 1/1965 | Chapman | A47J 43/0705 366/129 |
| 3,307,834 A | * | 3/1967 | Wilde | B01F 7/00141 366/330.4 |
| 3,734,469 A | * | 5/1973 | Goldstein | B01F 7/0025 165/109.1 |
| 4,013,273 A | * | 3/1977 | Danyliw | C22B 1/14 366/327.1 |

(Continued)

*Primary Examiner* — David Sorkin
*Assistant Examiner* — Abbas Rashid
(74) *Attorney, Agent, or Firm* — Muncy, Geissler, Olds & Lowe, P.C.

(57) ABSTRACT

A multifunctional food processor is provided comprising a driving device, a stirring container and a blade assembly. The driving device directly or indirectly drives the blade assembly, and the blade assembly is rotatably disposed in the stirring container. The blade assembly comprises a blade shaft capable of receiving at least two layers of stirring blades. At least one of the layers of stirring blades is consisted of a blade carrier and at least two blades, at least one of the blades extending in an angle of 85 to 95 degree with respect to the blade shaft, and at least another one of the blades extending upward in an angle of 0 to 80 degree with respect to the blade shaft. Another one of the layers of stirring blades is consisted of a blade carrier and at least one blade extending in an angle of 85 to 95 degree with respect to the blade shaft.

8 Claims, 3 Drawing Sheets

(56) References Cited

U.S. PATENT DOCUMENTS

| | | | | |
|---|---|---|---|---|
| 4,054,272 A * | 10/1977 | Cooke | ............... | B01F 7/00141 |
| | | | | 366/327.3 |
| 4,090,696 A * | 5/1978 | Kipke | ............... | B01F 7/00141 |
| | | | | 366/327.4 |
| 4,240,905 A * | 12/1980 | Scaccia | ............... | B01F 3/04531 |
| | | | | 162/57 |
| 4,479,721 A * | 10/1984 | Rieger | ............... | B01F 7/00158 |
| | | | | 366/147 |
| 4,552,461 A * | 11/1985 | Ott | ............... | B01F 7/0025 |
| | | | | 366/194 |
| 4,833,897 A * | 5/1989 | Burns | ............... | F25C 5/16 |
| | | | | 366/137 |
| 4,891,966 A * | 1/1990 | Kramer | ............... | G01N 1/286 |
| | | | | 366/307 |
| 5,098,669 A * | 3/1992 | Kawanami | ............... | B01F 7/183 |
| | | | | 366/302 |
| 5,320,500 A * | 6/1994 | Cholet | ............... | B01F 7/00916 |
| | | | | 366/190 |
| 6,532,863 B1 * | 3/2003 | Lee | ............... | A47J 43/0722 |
| | | | | 241/282.1 |
| 7,223,076 B2 * | 5/2007 | Mansson | ............... | B63H 23/34 |
| | | | | 416/204 R |
| 7,641,380 B2 * | 1/2010 | Behar | ............... | A47J 43/0722 |
| | | | | 241/282.1 |
| D647,364 S * | 10/2011 | Audette | ............... | D7/376 |
| D668,115 S * | 10/2012 | Potter | ............... | D7/376 |
| 2008/0198691 A1 * | 8/2008 | Behar | ............... | A47J 43/0722 |
| | | | | 366/205 |
| 2012/0091245 A1 * | 4/2012 | Menashes | ............... | A47J 43/0722 |
| | | | | 241/282.1 |

* cited by examiner

MULTIFUNCTIONAL FOOD PROCESSOR

FIELD OF THE INVENTION

The present invention relates to a multifunctional food processor and, in particular, to a modification technique for multifunctional food processors.

BACKGROUND OF THE INVENTION

Stirrers or food processors commonly available on the market comprise blade assembly with only a single layer of stirring blades. Although several kinds of food processors are provided with two or three layers of stirring blades, each layer is consisted of stirring blades of the same shape or similar shapes, and most of the blades cannot be disconnected with each other. Therefore these blades can not be combined in various ways, which limits the kind of foods that the processor can process.

SUMMARY OF THE INVENTION

In the light of the foregoing, it is an object of the present invention to provide a multifunctional food processor that is able to process more kinds of foods with higher efficiency, which is also with reasonable design, convenient and practical.

To achieve the object, a multifunctional food processor is provided comprising a driving device, a stirring container and a blade assembly. The driving device directly or indirectly drives the blade assembly, and the blade assembly is rotatably disposed in the stirring container.

According to the present invention, the blade assembly comprises a blade shaft capable of receiving at least two layers of stirring blades. At least one of the layers of stirring blades is consisted of a blade carrier and at least two blades, at least one of the blades extending in an angle of 85 to 95 degree with respect to the blade shaft, and at least another one of the blades extending upward in an angle of 0 to 80 degree with respect to the blade shaft. Another one of the layers of stirring blades is consisted of a blade carrier and at least one blade extending in an angle of 85 to 95 degree with respect to the blade shaft.

The blade shaft can be connected either with at least two layers of stirring blades, or with any one of the layers of stirring blades.

Since the blade shaft in the present invention can be provided with at least two layers of stirring blades, and one layer comprises at least one blade extending upward and at least another one blade extending substantially horizontally, the space that the stirring blades passing through forms a three-dimensional shape, therefore providing a larger stirring scope and a greater efficiency, making it suitable to stir large amount of food and hard food. Since the another layer of stirring blades only comprises substantially horizontally disposed blades, the space that the stirring blades passing through is in a flat shape, therefore providing a smaller stirring scope, making it suitable to stir small amount of food and soft food. Therefore different types of food can be stirred by combining the two layers of blades.

Different stirring blades are combined in the present invention, such that more kinds of food can be processed and greater efficiency can be achieved. The multifunctional food processor provided by the present invention is smartly designed, of excellent performance and very convenient and practical.

BRIEF DESCRIPTION OF THE DRAWINGS

Further advantages and details of the invention emerge from the example embodiments described below, which do not limit the invention in any way, and from the drawings, in which.

Figure 1:
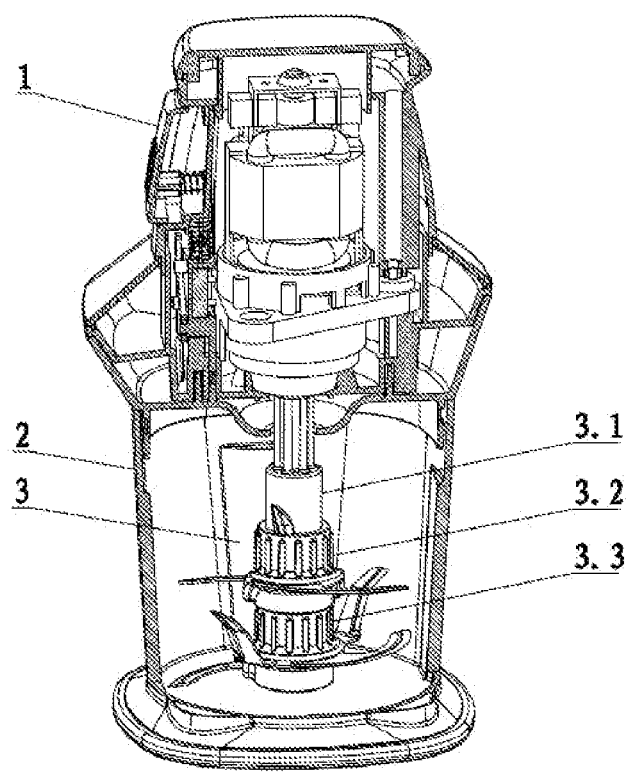
FIG. 1 is a sectional view showing a first embodiment according to the present invention.
Figure 2:
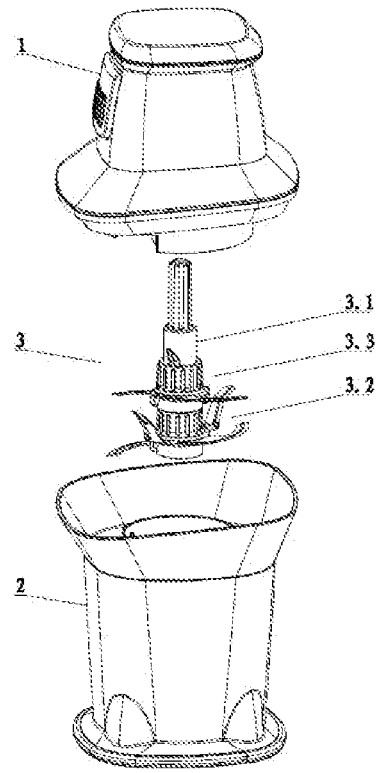
FIG. 2 is an exploded view showing the first embodiment according to the present invention.
Figure 3:
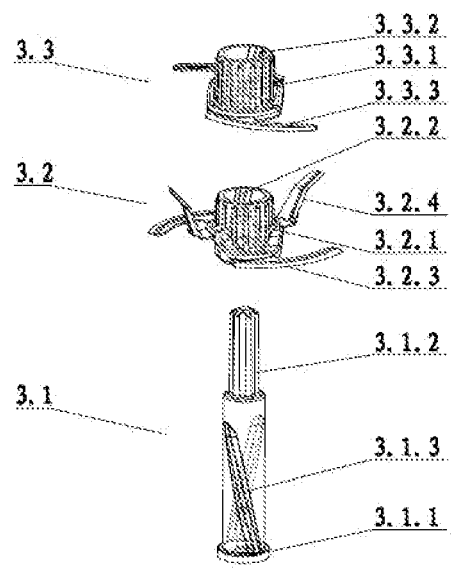
FIG. 3 is an exploded view showing the blade assembly in the first embodiment.
Figure 4:
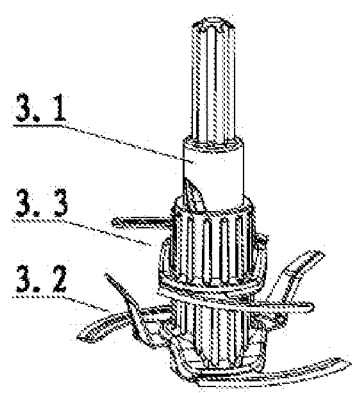
FIG. 4 shows an exemplary mounting way of the first embodiment according to the present invention.

Elements that are irrelevant to the spirit of the invention are omitted for clarity.

DETAILED DESCRIPTION OF THE INVENTION

The terminology used herein is for the purpose of describing particular embodiments only and is not intended to be limiting of example embodiments of the invention. As used herein, the singular forms "a" "an" and "the" are intended to include the plural forms as well, unless the context clearly indicates otherwise. As used herein, the terms "and/or" include any and all combinations of one or more of the associated listed items. It will be further understood that the terms "comprises", "comprising", "includes" and/or "including" when used herein, specify the presence of stated features, integers, steps, operations, elements, and/or components, but do not preclude the presence or addition of one or more other features, integers, steps, operations, elements, components, and/or groups thereof.

With reference to the FIGS. 1 to 4, a multifunctional food processor according to the first embodiment of the present invention comprises a driving device 1, a stirring container 2 and a blade assembly 3. The driving device 1 directly or indirectly drives the blade assembly 3, and the blade assembly 3 is rotatably disposed in the stirring container 2.

In the first embodiment, the blade assembly 3 comprises a blade shaft 3.1 capable of receiving at least two layers of stirring blades. At least one of the layers of stirring blades is consisted of a blade carrier and at least two blades, at least one of the blades 3.2.3 extending in an angle of 85 to 95 degree with respect to the blade shaft, and at least another one of the blades 3.2.4 extending upward in an angle of 0 to 80 degree with respect to the blade shaft. Another one of the layers of stirring blades is consisted of a blade carrier and at least one blade extending in an angle of 85 to 95 degree with respect to the blade shaft.

The blade assembly 3 is consisted of a blade shaft 3.1 and at least two layers of stirring blades, i.e., a first layer 3.2 and a second layer 3.3. The first layer of stirring blades 3.2 is consisted of a blade carrier and at least two blades. At least one of the blades 3.2.3 in the first layer 3.2 extends in an angle of 85 to 95 degree with respect to the blade shaft, and at least another one of the blades 3.2.4 in the first layer 3.2 extends upward in an angle of 0 to 80 degree with respect to the blade shaft. The second layer of stirring blades 3.3 is consisted of a blade carrier 3.3.1 and at least one blade 3.3.3 extending in an angle of 85 to 95 degree with respect to the blade shaft.

In a further embodiment, the at least one of the blades 3.2.3 in the first layer 3.2 extends in an angle of 90 degree with respect to the blade shaft, therefore when the blade shaft 3.1 is vertically disposed, the blade 3.2.3 is disposed horizontally. The at least another one of the blades 3.2.4 in the first layer 3.2 extends upward in an angle of 60 degree with respect to the blade shaft. The second layer of stirring blades 3.3 is consisted of a blade carrier 3.3.1 and at least one blade 3.3.3 extending in an angle of 90 degree with respect to the blade shaft, therefore when the blade shaft 3.1 is vertically disposed, the blade 3.3.3 is disposed horizontally.

In one embodiment, the first layer of stirring blades 3.2 is consisted of one blade carrier and two blades. One blade 3.2.3 extends in an angle of 90 degree with respect to the blade shaft, and another one blade 3.2.4 extends upward in an angle of 0 to 80 degree with respect to the blade shaft. The second layer of stirring blades 3.3 is consisted of a blade carrier 3.3.1 and one blade 3.3.3 extending in an angle of 85 to 95 degree with respect to the blade shaft.

In the example as showed, the blade 3.2.3 extends in an angle of 90 degree with respect to the blade shaft, therefore when the blade shaft 3.1 is vertically disposed, the blade 3.2.3 is disposed horizontally. Another one blade 3.2.4 extends upward in an angle of 60 degree with respect to the blade shaft. The second layer of stirring blades 3.3 is consisted of a blade carrier 3.3.1 and one blade 3.3.3 extending in an angle of 90 degree with respect to the blade shaft, therefore when the blade shaft 3.1 is vertically disposed, the blade 3.3.3 is disposed horizontally.

In the present example, the blade 3.2.4 extends upward in an angle of 60 degree with respect to the blade shaft.

In addition, to facilitate the assembling, one end of the blade shaft 3.1 is provided with a flange 3.1.1 for positioning, while the other end of the blade shaft is provided with a connector 3.2.1 for cooperating with the driving device 1.

To provide a greater performance, the blade extending upward 3.2.4 comprises at least two segments of blade. One segment of blade extends upward in an angle of 0 to 80 degree with respect to the blade shaft, and another one segment of blade extends upward in an angle of 0 to 60 degree with respect to the blade shaft. In the example as showed, one segment of blade extends upward in an angle of 60 degree with respect to the blade shaft, and another one segment of blade extends upward in an angle of 45 degree with respect to the blade shaft.

In order to better secure the first layer of stirring blades 3.2 and the second layer of stirring blades 3.3, the outer surface of the blade shaft 3.1 is provided with at least one positioning rip or slot 3.1.3. The positioning rip or slot extends from the bottom to approximately the top of the blade shaft, inclining in a direction the same as the rotating direction of the blade assembly, defining an angle of 0 to 80 degree with respect to the blade shaft.

Correspondingly, each of the blade carriers 3.2.1 and 3.3.1 is provided in a central position with a through hole, and the through hole is provided with a positioning rip or slot 3.2.2 or 3.3.2 inclining in a direction the same as the inclining direction of the positioning rip or slot 3.3.1 in the blade shaft 3.1. The first and the second layers of stirring blades 3.2 and 3.3 are removably connected with the blade shaft by the through hole.

Since the positioning rip or slot cooperating with each other is inclining, when the two layers of stirring blades 3.2 and 3.3 are being rotated by the driving device 1 through the blade shaft 3.1, a component force would be generated downwardly, so as to ensure that the two layers of stirring blades 3.2 and 3.3 would not move upward.

To meet the requirement of different users, the first and the second layers of stirring blades 3.2 and 3.3 are connected with the blade shaft by one layer stacking on another one layer. The upper disposed layer and the lower disposed layer can be exchanged. In the example as showed, the first layer of stirring blades 3.2 is disposed on the bottom of the blade shaft 3.1, while the second layer of stirring blades 3.3 is disposed on the top of the blade shaft 3.1.

By the multifunctional food processor provided according to the present invention, the first layer of stirring blades comprises at least one blade extending upward and at least another one blade extending substantially horizontally, allowing the space that the stirring blades passing through to be three-dimensional, therefore providing a larger stirring scope and a greater efficiency, making it suitable to stir large amount of food and hard food. Since the second layer of stirring blades only comprises substantially horizontally disposed blades, the space that the stirring blades passing through is flat, therefore providing a smaller stirring scope, making it suitable to stir small amount of food and soft food. Therefore different types of food can be stirred by combining two layers of blades. Different stirring blades are combined in the present invention, such that more kinds of food can be processed and greater efficiency can be achieved.

Figure 5:
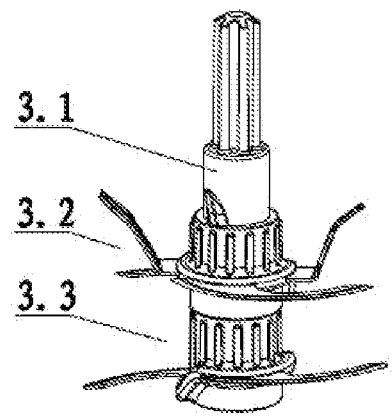
FIG. 5 shows an exemplary mounting way of a second embodiment according to the present invention.

FIG. 5 shows the second embodiment of the present invention, which is similar to the first embodiment, except that the first layer of stirring blades 3.2 is disposed on the top of the blade shaft 3.1, while the second layer of stirring blades 3.3 is disposed on the bottom of the blade shaft 3.1.

Figure 6:
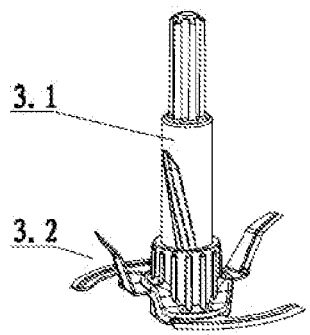
FIG. 6 shows an exemplary mounting way of a third embodiment according to the present invention.

FIG. 6 shows the third embodiment of the present invention, which is similar to the first embodiment, except that the blade shaft 3.1 is only provided with the first layer of stirring blades 3.2. The first layer of stirring blades comprises at least one blade extending upward and at least another one blade extending substantially horizontally, allowing the space that the stirring blades passing through to be three-dimensional, therefore providing a larger stirring scope and a greater efficiency, making it suitable to stir large amount of food and hard food.

Figure 7:
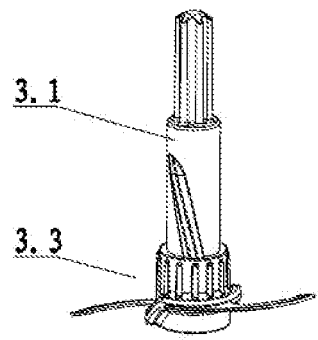
FIG. 7 shows an exemplary mounting way of a forth embodiment according to the present invention.

FIG. 7 shows the forth embodiment of the present invention, which is similar to the first embodiment, except that the blade shaft 3.1 is only provided with the second layer of stirring blades 3.3. Since the second layer of stirring blades only comprises substantially horizontally disposed blades, the space that the stirring blades passing through is flat, therefore providing a smaller stirring scope, making it suitable to stir small amount of food and soft food.

It should be understood that various example embodiments have been described with reference to the accompanying drawings in which only some example embodiments are shown. The present invention, however, may be embodied in many alternate forms and should not be construed as limited to only the example embodiments set forth herein.

What is claimed is:
1. A multifunctional food processor, comprising:
a driving device,
a stirring container, and
a blade assembly, the driving device directly or indirectly driving the blade assembly, and the blade assembly being rotatably disposed in the stirring container,
the blade assembly including a blade shaft receiving a first and a second layer of stirring blades, the first layer of stirring blades including a blade carrier and at least two blades, at least one of the first layer of stirring blades extending in an angle of 85 to 95 degree with respect to the blade shaft, and at least another one of the first layer of stirring blades extending upward in an angle of 0 to 80 degree with respect to the blade shaft, and the second layer of stirring blades including a blade carrier and at least one blade extending in an angle of 85 to 95 degree with respect to the blade shaft;

wherein an outer surface of the blade shaft is provided with at least one positioning rip or slot, the positioning rip or slot extending from a bottom to approximately a top of the blade shaft inclining in a circumferential direction identical to a rotating direction of the blade assembly and extending no more than a fraction of the circumference of the blade shaft, defining an angle of 0 to 80 degree with respect to the blade shaft, and wherein correspondingly each of the blade carriers is provided in a central position with a through hole, the through hole being provided with a positioning rip or slot inclining in a direction identical to that of the positioning rip or slot in the blade shaft, the first and the second layers of stirring blades being removably connected with the blade shaft by the through hole so that when the blade shaft is rotated by the driving device, a component force is directed downwardly.

2. The multifunctional food processor of claim 1, wherein the first layer of stirring blades includes a blade carrier and two blades, one blade extending in an angle of 85 to 95 degree with respect to the blade shaft, and another one blade extending upward in an angle of 0 to 80 degree with respect to the blade shaft, and wherein the second layer of stirring blades includes a blade carrier and one blade extending in an angle of 85 to 95 degree with respect to the blade shaft.

3. The multifunctional food processor of claim 2, wherein the first layer of stirring blades includes a blade carrier and two blades, one blade extending in an angle of 90 degree with respect to the blade shaft, and another one blade extending upward in an angle of 0 to 80 degree with respect to the blade shaft, and wherein the second layer of stirring blades includes a blade carrier and one blade extending in an angle of 90 degree with respect to the blade shaft.

4. The multifunctional food processor of claim 1, wherein one end of the blade shaft is provided with a flange for positioning, while another one end of the blade shaft is provided with a connector for cooperating with the driving device.

5. The multifunctional food processor of claim 1, wherein the at least one of the blades extending upward comprises at least two segments of blades, the two segments extending upwardly at different angles, wherein one of the segments of blades extends upward in an angle of 0 to 80 degree with respect to the blade shaft, and another one of the segments of blades extends upward in an angle of 0 to 60 degree with respect to the blade shaft.

6. The multifunctional food processor of claim 1, wherein the first and the second layers of stirring blades are connected with the blade shaft by one layer stacking on another one layer.

7. The multifunctional food processor of claim 6, wherein one of the first and the second layers of stirring blades is disposed on a bottom of the blade shaft, while another one of the first and the second layers of stirring blades is disposed on a top of the blade shaft.

8. The multifunctional food processor of claim 6, wherein the blade shaft is connected with both of the first and the second layers of stirring blades, or the blade shaft is connected with any one of the first and the second layers of stirring blades.

\* \* \* \* \*